United States Patent
Kang

(10) Patent No.: US 12,548,610 B2
(45) Date of Patent: Feb. 10, 2026

(54) CLOCK DISTRIBUTION NETWORK, AND A SEMICONDUCTOR APPARATUS AND A SEMICONDUCTOR SYSTEM INCLUDING THE SAME

(71) Applicant: SK hynix Inc., Icheon-si (KR)

(72) Inventor: Ji Hyo Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 190 days.

(21) Appl. No.: 18/497,747

(22) Filed: Oct. 30, 2023

(65) Prior Publication Data

US 2024/0312502 A1    Sep. 19, 2024

(30) Foreign Application Priority Data

Mar. 17, 2023  (KR) .................. 10-2023-0035224

(51) Int. Cl.
*G11C 7/22* (2006.01)
*G11C 7/10* (2006.01)

(52) U.S. Cl.
CPC ............ *G11C 7/222* (2013.01); *G11C 7/1039* (2013.01); *G11C 7/1057* (2013.01)

(58) Field of Classification Search
CPC ..................................................... G11C 7/222
See application file for complete search history.

(56) References Cited

U.S. PATENT DOCUMENTS

| | | | |
|---|---|---|---|
| 10,128,844 B2 | 11/2018 | Lee | |
| 10,642,512 B2 | 5/2020 | Kim | |
| 11,036,432 B2 | 6/2021 | He | |
| 2002/0056021 A1* | 5/2002 | Manning | G06F 5/06 711/167 |
| 2023/0305592 A1* | 9/2023 | Hwang | G06F 1/12 |

* cited by examiner

*Primary Examiner* — Hoai V Ho
(74) *Attorney, Agent, or Firm* — WILLIAM PARK AND ASSOCIATES LTD.

(57) ABSTRACT

A clock distribution network includes at least two buffers that receive the same clock signal and generate different clock signals. In a first operation mode, the at least two buffers are all activated. In a second operation mode, one of the at least two buffers is activated. In the second operation mode, the other one of the at least two buffers is partially activated without being deactivated.

23 Claims, 8 Drawing Sheets

CLOCK DISTRIBUTION NETWORK, AND A SEMICONDUCTOR APPARATUS AND A SEMICONDUCTOR SYSTEM INCLUDING THE SAME

CROSS-REFERENCES TO RELATED APPLICATION

The present application claims priority under 35 U.S.C. § 119(a) to Korean application number 10-2023-0035224, filed on Mar. 17, 2023, in the Korean Intellectual Property Office, which is incorporated herein by reference in its entirety.

BACKGROUND

1. Technical Field

The present disclosure relates to an integrated circuit technology, and more particularly, to a clock distribution network, and a semiconductor apparatus and a semiconductor system including the same.

2. Related Art

An electronic device may include many electronic components, and among them, a computer system may include many semiconductor apparatuses each made of semiconductors. The semiconductor apparatuses constituting the computer system may communicate with each other by transmitting and/or receiving system clock signals, command address signals, and data. The semiconductor apparatuses may synchronize the command address signal and the data with the system clock signal. The semiconductor apparatuses may each include an internal clock generation circuit, and the internal clock generation circuit may generate a plurality of internal clock signals from the system clock signal. The internal clock generation circuit may distribute the plurality of internal clock signals to a plurality of internal circuits that transmit and/or receive the command address signal and the data.

On the other hand, when semiconductor apparatuses operate in a low power mode, power consumption may be reduced by deactivating the internal clock generation circuit. However, when the internal clock generation circuit is activated from a deactivated state or vice versa, phases of the internal clock signals generated from the internal clock generation circuit may be changed. Changes in the phases of the internal clock signals may adversely affect the performance of the semiconductor apparatuses.

SUMMARY

A clock distribution network in accordance with an embodiment may include a first global buffer and a second global buffer. The first global buffer may be configured to receive a global clock signal, to generate a first distributed clock signal from the global clock signal, and to be fully activated in a first operation mode and a second operation mode. The second global buffer may be configured to receive the global clock signal, to generate a second distributed clock signal from the global clock signal, to be fully activated in the first operation mode, and to be partially activated in the second operation mode.

A semiconductor apparatus in accordance with an embodiment may include a first global buffer, a second global buffer, and a clock control circuit. The first global buffer may be configured to receive a global clock signal, and to buffer the global clock signal based on a first global enable signal and a second global enable signal. The second global buffer may be configured to receive the global clock signal, and to buffer the global clock signal based on the first global enable signal and a third global enable signal. The clock control circuit may be configured to enable all the first global enable signal, the second global enable signal, and the third global enable signal in a first operation mode, and to enable the first global enable signal and the second global enable signal and disable the third global enable signal in a second operation mode.

A semiconductor apparatus in accordance with an embodiment may include a global clock generation circuit, a first global buffer, and a second global buffer. The global clock generation circuit may be configured to generate a global clock signal based on a clock signal. The first global buffer may be configured to generate a first distributed clock signal from the global clock signal, and to provide the first distributed clock signal to a first clock path. The second global buffer may be configured to generate a second distributed clock signal from the global clock signal, and to provide the second distributed clock signal to a second clock path. In a first operation mode, the first and second global buffers are all fully activated. In a second operation mode, the first global buffer is fully activated and the second global buffer is partially activated.

DETAILED DESCRIPTION

Figure 1:
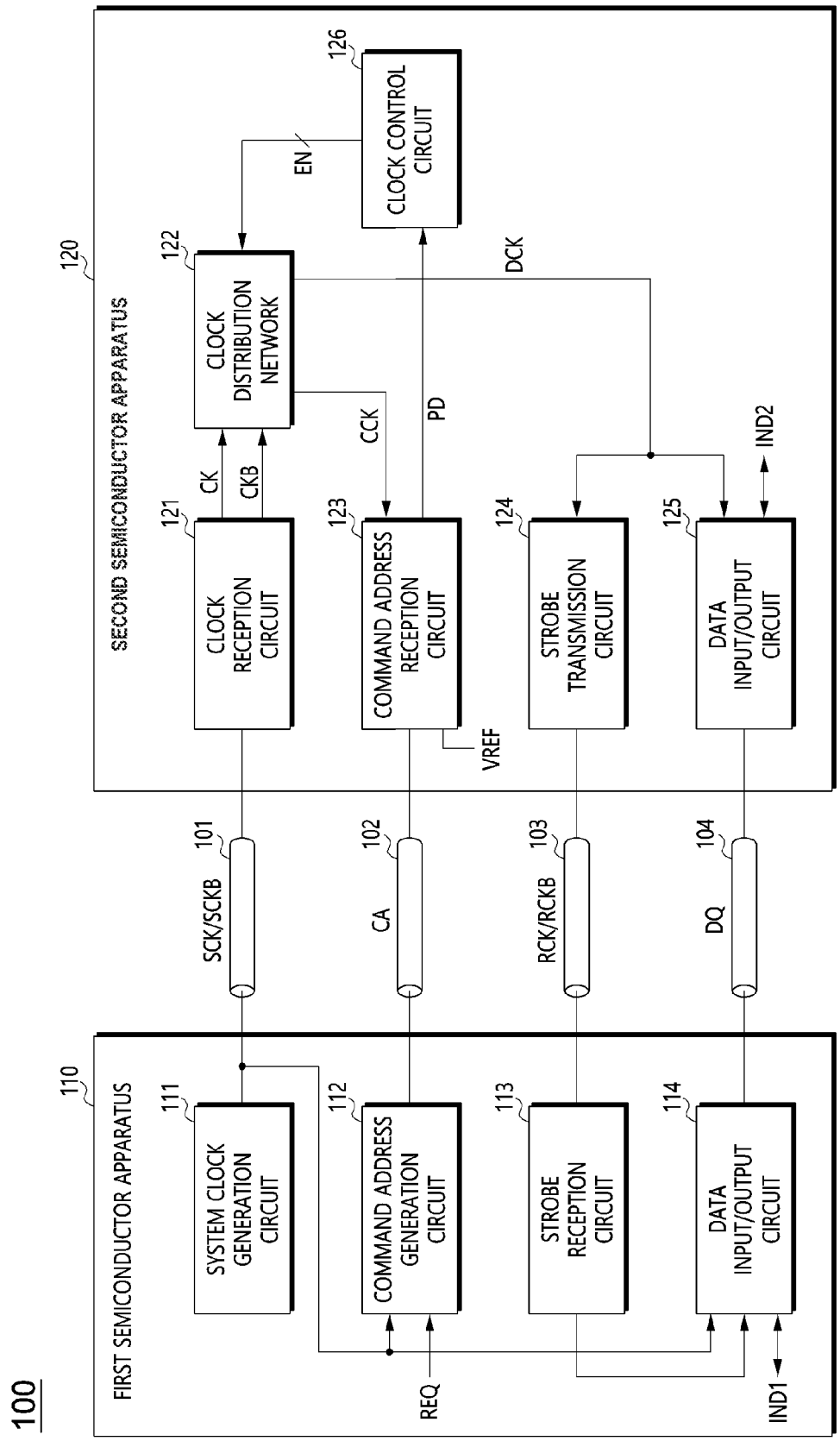
FIG. 1 is a diagram illustrating a configuration of a semiconductor system in accordance with an embodiment.

FIG. 1 is a diagram illustrating the configuration of a semiconductor system 100 in accordance with an embodiment. In FIG. 1, the semiconductor system 100 may include a first semiconductor apparatus 110 and a second semiconductor apparatus 120. The first semiconductor apparatus 110 may be a master device for controlling an operation of the second semiconductor apparatus 120, and the second semiconductor apparatus 120 may be a slave device capable of performing various operations under the control of the first semiconductor apparatus 110. The first semiconductor apparatus 110 may provide various control signals necessary for the operation of the second semiconductor apparatus 120. The first semiconductor apparatus 110 may include various types of host devices. For example, the first semiconductor apparatus 110 may a host device such as a central processing unit (CPU), a graphics processing unit (GPU), a multi-media processor (MMP), a digital signal processor, an application processor (AP), and a memory controller. The second semiconductor apparatus 120 may be, for example, a memory apparatus, and the memory apparatus may include volatile memory and nonvolatile memory. The volatile memory may include static RAM (SRAM), dynamic RAM (DRAM), and synchronous DRAM (SDRAM), and the nonvolatile memory may include read-only memory (ROM), programmable ROM (PROM), electrically erasable and programmable ROM (EEPROM), erasable and programmable ROM (EPROM), flash memory, phase-change RAM (PRAM), magnetic RAM (MRAM), resistive RAM (RRAM), ferroelectric RAM (FRAM), and the like.

The second semiconductor apparatus 120 may be connected to the first semiconductor apparatus 110 through a plurality of buses. The plurality of buses may be signal transmission paths, links, or channels for transmitting signals. The plurality of buses may include a clock bus 101, a command address bus 102, a strobe bus 103, a data bus 104, and the like. The clock bus 101 and the command address bus 102 may be unidirectional buses from the first semiconductor apparatus 110 to the second semiconductor apparatus 120, and the strobe bus 103 may be a unidirectional bus from the second semiconductor apparatus 120 to the first semiconductor apparatus 110. The data bus 104 may be a bi-directional bus. The second semiconductor apparatus 120 may be connected to the first semiconductor apparatus 110 through the clock bus 101, and may receive a system clock signal SCK from the first semiconductor apparatus 110. The system clock signal SCK may be transmitted through the clock bus 101 as a differential signal together with a complementary signal SCKB. The second semiconductor apparatus 120 may be connected to the first semiconductor apparatus 110 through the command address bus 102, and may receive a command address signal CA from the first semiconductor apparatus 110. The command address signal CA may include a plurality of signal sets each including a plurality of bits. The second semiconductor apparatus 120 may receive the command address signal CA based on the system clock signal SCK. The second semiconductor apparatus 120 may be connected to the first semiconductor apparatus 110 through the strobe bus 103, and may transmit a strobe signal RCK to the first semiconductor apparatus 110. The strobe signal RCK may be transmitted through the strobe bus 103 as a differential signal together with a complementary signal RCKB. The second semiconductor apparatus 120 may be connected to the first semiconductor apparatus 110 through the data bus 104, and may receive data DQ from the first semiconductor apparatus 110 through the data bus 104 or transmit the data DQ to the first semiconductor apparatus 110.

The first semiconductor apparatus 110 may include a system clock generation circuit 111, a command address generation circuit 112, a strobe reception circuit 113, and a data input/output circuit 114. The system clock generation circuit 111 may generate the system clock signal SCK and the complementary signal SCKB. The system clock generation circuit 111 may include any clock generator for generating the system clock signal SCK. For example, the system clock generation circuit may include an oscillator, a phase locked loop circuit, a delay locked loop circuit, or the like. The system clock generation circuit 111 may generate the system clock signal SCK having a frequency suitable for communication between the first and second semiconductor apparatuses 110 and 120. The system clock generation circuit 111 may transmit the system clock signal SCK and the complementary signal SCKB to the second semiconductor apparatus 120 through the clock bus 101. The system clock generation circuit 111 may provide the system clock signal SCK and the complementary signal SCKB to at least one of the command address generation circuit 112 and the data input/output circuit 114.

The command address generation circuit 112 may generate the command address signal CA based on a request REQ. The command address generation circuit 112 may generate the command address signal CA instructing the second semiconductor apparatus 120 to perform various operations according to the request REQ. The command address generation circuit 112 may transmit the command address signal CA to the second semiconductor apparatus 120 through the command address bus 102. The command address generation circuit 112 may receive the system clock signal SCK, and transmit the command address signal CA to the command address bus 102 in synchronization with the system clock signal SCK.

The strobe reception circuit 113 may be connected to the second semiconductor apparatus 120 through the strobe bus 104, and may receive the strobe signal RCK transmitted from the second semiconductor apparatus 120 through the strobe bus 104. The strobe reception circuit 113 may provide the strobe signal RCK to the data input/output circuit 114.

The data input/output circuit 114 may be connected to the second semiconductor apparatus 120 through the data bus 104, and may transmit the data DQ to the second semiconductor apparatus 120 through the data bus 104 or receive the data DQ transmitted from the second semiconductor apparatus 120. The data input/output circuit 114 may receive the system clock signal SCK and perform a data output operation based on the system clock signal SCK. The data input/output circuit 114 may transmit internal data IND1 of the first semiconductor apparatus 110 as the data DQ in synchronization with the system clock signal SCK. The data input/output circuit 114 may receive the strobe signal RCK and perform a data input operation based on the strobe signal RCK. The data input/output circuit 114 may receive the data DQ transmitted from the second semiconductor apparatus 120 in synchronization with the strobe signal SCK, and generate the internal data IND1 of the first semiconductor apparatus 110 based on the received data.

The second semiconductor apparatus 120 may include a clock reception circuit 121, a clock distribution network 122, a command address reception circuit 123, a strobe transmission circuit 124, and a data input/output circuit 125. The clock reception circuit 121 may be connected to the clock bus 101, and may receive the system clock signal SCK transmitted from the first semiconductor apparatus 110 through the clock bus 101. The clock reception circuit 121 may receive the system clock signal SCK by differentially amplifying the system clock signal SCK and the complementary signal SCKB. The clock reception circuit 121 may receive the system clock signal SCK and the complementary signal SCKB to generate a reference clock signal pair CK and CKB. The reference clock signal pair CK and CKB may be provided to the clock distribution network 122.

The clock distribution network 122 may be connected to the clock reception circuit 121, and may receive the reference clock signal pair CK and CKB from the clock reception circuit 121. In an embodiment, the clock reception circuit 121 may be integrated into the clock distribution network 122. The clock distribution network 122 may generate a plurality of internal clock signals based on the reference clock signal pair CK and CKB. The plurality of internal clock signals may include a command clock signal CCK and a data clock signal DCK. The clock distribution network 122 may distribute the plurality of internal clock signals to internal circuits of the second semiconductor apparatus 120. The clock distribution network 122 may provide the command clock signal CCK to the command address reception circuit 123, and provide the data clock signal DCK to the strobe transmission circuit 124 and the data input/output circuit 125. The data clock signal DCK may have a higher frequency than the command clock signal CCK. The clock distribution network 122 may include a frequency divider such as a clock divider to generate a plurality of internal clock signals having different frequencies from the system clock signal pair SCK and SCKB and/or the reference clock signal pair CK and CKB. The clock distribution network 122 may include a plurality of clock trees and/or clock paths including a plurality of buffers to distribute the plurality of internal clock signals.

The command address reception circuit 123 may be connected to the command address bus 102, and may receive the command address signal CA transmitted from the first semiconductor apparatus 110 through the command address bus 102. The command address reception circuit 123 may receive a reference voltage VREF, and receive the command address signal CA by differentially amplifying the command address signal CA and the reference voltage VREF. The command address reception circuit 123 may receive the command clock signal CCK from the clock distribution network 122. The command address reception circuit 123 may synchronize the command address signal CA with the command clock signal CCK by latching the received command address signal in synchronization with the command clock signal CCK.

The strobe transmission circuit 124 may receive the data clock signal DCK from the clock distribution network 122, and generate the strobe signal RCK based on the data clock signal DCK. The strobe transmission circuit 124 may be connected to the first semiconductor apparatus 110 through the strobe bus 103, and may transmit the strobe signal RCK to the first semiconductor apparatus 110 through the strobe bus 103.

The data input/output circuit 125 may be connected to the first semiconductor apparatus 110 through the data bus 104, and may transmit the data DQ to the first semiconductor apparatus 110 through the data bus 104 or receive the data DQ transmitted from the first semiconductor apparatus 110. The data input/output circuit 125 may receive the data clock signal DCK from the clock distribution network 122, and perform a data input/output operation based on the data clock signal DCK. The data input/output circuit 125 may transmit internal data IND2 of the second semiconductor apparatus 120 as the data DQ in synchronization with the data clock signal DCK. The data input/output circuit 125 may receive the data DQ transmitted from the first semiconductor apparatus 110 in synchronization with the data clock signal DCK, and may generate the internal data IND2 of the second semiconductor apparatus 120 based on the received data.

The second semiconductor apparatus 120 may further include a clock control circuit 126. The clock control circuit 126 may be connected to the command address reception circuit 123, and may receive an operation mode signal PD. The command address reception circuit 123 may enable or disable the operation mode signal PD based on the command address signal CA. For example, the operation mode signal PD may be a power-down signal. The power-down signal may be a signal for allowing the second semiconductor apparatus 120 to enter a low power mode. The low power mode may include at least one of a power-down mode, a standby mode, and a sleep mode. When the operation mode signal PD is enabled, the second semiconductor apparatus 120 may enter a second operation mode from a first operation mode. When the operation mode signal PD is disabled, the second semiconductor apparatus 120 may enter the first operation mode from the second operation mode. The first operation mode may be an active mode of the second semiconductor apparatus 120, and the second semiconductor apparatus 120 may perform various operations including a data input/output operation in the active mode. The second operation mode may be the low power mode. Based on the operation mode signal PD, the clock control circuit 126 may control whether the plurality of buffers included in the clock distribution network 122 are activated. The clock control circuit 126 may activate all the plurality of buffers of the clock distribution network 122 in the first operation mode. The clock control circuit 126 may fully activate some buffers among the plurality of buffers in the second operation mode. The clock control circuit 126 may partially activate other buffers among the plurality of buffers in the second operation mode. The clock control circuit 126 may deactivate the remaining buffers among the plurality of buffers in the second operation mode. The clock control circuit 126 may generate a plurality of enable signals EN based on the operation mode signal PD to fully activate, partially activate, or deactivate the plurality of buffers of the clock distribution network 122. The clock control circuit 126 may provide the plurality of enable signals EN to the clock distribution network 122.

Figure 2:
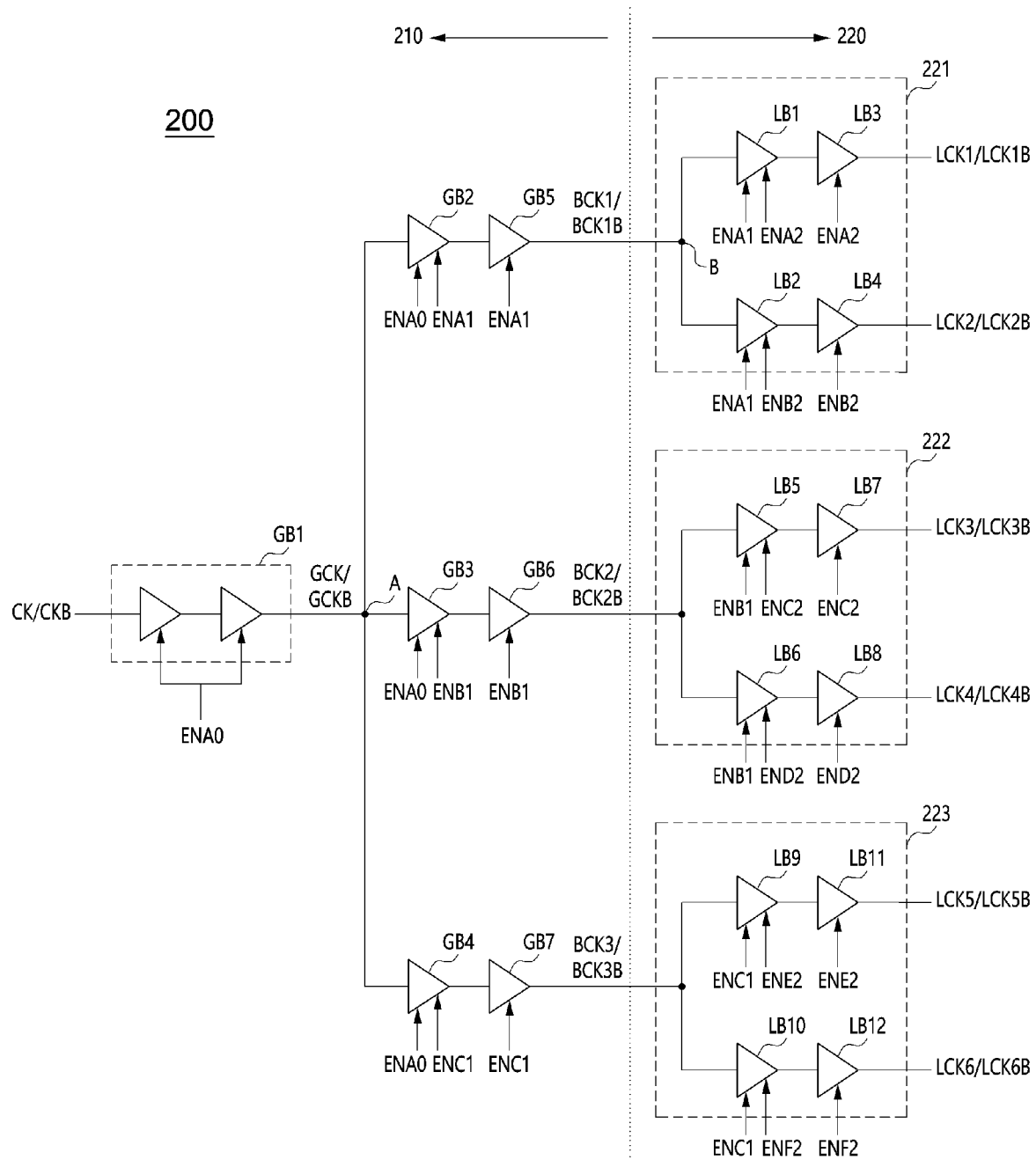
FIG. 2 is a diagram illustrating a configuration of a clock distribution network in accordance with an embodiment.

FIG. 2 is a diagram illustrating the configuration of a clock distribution network 200 in accordance with an embodiment. Referring to FIG. 2, the clock distribution network 200 may include a global clock path 210 and a local clock path 220. The global clock path 210 may receive a reference clock signal CK and buffer the reference clock signal CK. The global clock path 210 may distribute the buffered reference clock signal CK to the local clock path 220. The global clock path 210 may generate a global clock signal GCK by buffering the reference clock signal CK. The global clock path 210 may distribute the global clock signal GCK as a plurality of distributed clock signals. For example, the global clock path 210 may generate a first distributed clock signal BCK1, a second distributed clock signal BCK2, and a third distributed clock signal BCK3 from the global clock signal GCK. FIG. 2 illustrates an example in which the global clock path 210 generates three distributed clock signals; however, the present disclosure is not limited thereto. For example, the global clock path 210 may generate two or four distributed clock signals, or may generate a different number of distributed clock signals.

The global clock path 210 may be fully or partially activated according to an operation mode. The global clock path 210 may be fully activated in a first operation mode, and may be partially activated in a second operation mode. The second operation mode may be a power-down mode, and the first operation mode may be an active mode other than the power-down mode. The global clock path 210 may generate the global clock signal GCK in the first and second operation modes regardless of the operation mode. In the first operation mode, the global clock path 210 may generate all the first to third distributed clock signals BCK1 to BCK3 from the global clock signal GCK. In the second operation mode, the global clock path 210 may generate at least one of the first to third distributed clock signals BCK1 to BCK3, and might not generate the others. For example, in the second operation mode, the global clock path 210 may generate the first distributed clock signal BCK1 and might not generate the second and third distributed clock signals BCK2 and BCK3. The global clock path 210 may receive a plurality of enable signals. The global clock path 210 may be activated based on the plurality of enable signals. The plurality of enable signals may be signals provided from the clock control circuit 126 illustrated in FIG. 1. The plurality of enable signals may include at least a first global enable signal ENA0, a second global enable signal ENA1, a third global enable signal ENB1, and a fourth global enable signal ENC1. The first to fourth global enable signals ENA0, ENA1, ENB1, and ENC1 may be selectively enabled according to the operation mode.

The local clock path 220 may receive the first to third distributed clock signals BCK1 to BCK3 from the global clock path 210. The local clock path 220 may buffer the first to third distributed clock signals BCK1 to BCK3 to generate a first local clock signal LCK1, a second local clock signal LCK2, a third local clock signal LCK3, a fourth local clock signal LCK4, a fifth local clock signal LCK5, and a sixth local clock signal LCK6. FIG. 2 illustrates an example in which the local clock path 220 generates six local clock signals; however, the present disclosure is not limited thereto. The local clock path 220 may generate fewer or more than six local clock signals. The local clock path 220 may generate the first and second local clock signals LCK1 and LCK2 from the first distributed clock signal BCK1. The local clock path 220 may generate the third and fourth local clock signals LCK3 and LCK4 from the second distributed clock signal BCK2. The local clock path 220 may generate the fifth and sixth local clock signals LCK5 and LCK6 from the third distributed clock signal BCK3. The local clock path 220 may include a first local clock path 221, a second local clock path 222, and a third local clock path 223.

The first local clock path 221 may receive the first distributed clock signal BCK1, and generate the first and second local clock signals LCK1 and LCK2 by distributing the first distributed clock signal BCK1. The first local clock path 221 may be fully activated in the first operation mode and partially activated in the second operation mode. In the first operation mode, the first local clock path 221 may generate both the first and second local clock signals LCK1 and LCK2 from the first distributed clock signal BCK1. In the second operation mode, the first local clock path 221 may generate the first local clock signal LCK1 from the first distributed clock signal BCK1 and might not generate the second local clock signal LCK2. The first local clock path 221 may receive a plurality of enable signals. The first local clock path 221 may be activated based on the plurality of enable signals. The plurality of enable signals may be signals provided from the clock control circuit 126 illustrated in FIG. 1. The plurality of enable signals may include at least the second global enable signal ENA1, a first local enable signal ENA2, and a second local enable signal ENB2. The second global enable signal ENA1, the first local enable signal ENA2, and the second local enable signal ENB2 may be selectively enabled according to the operation mode.

The second local clock path 222 may receive the second distributed clock signal BCK2, and generate the third and fourth local clock signals LCK3 and LCK4 by distributing the second distributed clock signal BCK2. The second local clock path 222 may be fully activated in the first operation mode, and may be deactivated in the second operation mode. In the first operation mode, the second local clock path 222 may generate both the third and fourth local clock signals LCK3 and LCK4 from the second distributed clock signal BCK2. In the second operation mode, the second local clock path 222 might not generate the third and fourth local clock signals LCK3 and LCK4. The second local clock path 222 may receive a plurality of enable signals. The second local clock path 222 may be activated based on the plurality of enable signals. The plurality of enable signals may be signals provided from the clock control circuit 126 illustrated in FIG. 1. The plurality of enable signals may include at least the third global enable signal ENB1, a third local enable signal ENC2, and a fourth local enable signal END2. The third global enable signal ENB1, the third local enable signal ENC2, and the fourth local enable signal END2 may be selectively enabled according to the operation mode.

The third local clock path 223 may receive the third distributed clock signal BCK3 and generate the fifth and sixth local clock signals LCK5 and LCK6 by distributing the third distributed clock signal BCK3. The third local clock path 223 may be fully activated in the first operation mode, and may be deactivated in the second operation mode. In the first operation mode, the third local clock path 223 may generate both the fifth and sixth local clock signals LCK5 and LCK6 from the third distributed clock signal BCK3. In the second operation mode, the third local clock path 223 might not generate the fifth and sixth local clock signals LCK5 and LCK6. The third local clock path 223 may receive a plurality of enable signals. The third local clock path 223 may be activated based on the plurality of enable signals. The plurality of enable signals may be signals provided from the clock control circuit 126 illustrated in FIG. 1. The plurality of enable signals may include at least the fourth global enable signal ENC1, a fifth local enable signal ENE2, and a sixth local enable signal ENF2. The fourth global enable signal ENC1, the fifth local enable signal ENE2, and the sixth local enable signal ENF2 may be selectively enabled according to the operation mode.

The global clock path 210 may include a first global buffer GB1, a second global buffer GB2, a third global buffer GB3, and a fourth global buffer GB4. The first global buffer GB1 may receive the reference clock signal CK, and generate the global clock signal GCK by buffering the reference clock signal CK. The first global buffer GB1 may be fully activated regardless of the operation mode. The first global buffer GB1 may receive the first global enable signal ENA0. The first global enable signal ENA0 may remain enabled regardless of the operation mode. The first global buffer GB1 may include a plurality of buffers sequentially connected in series. The first global buffer GB1 may provide the global clock signal GCK to the second to fourth global buffers GB2 to GB4 in common.

The second global buffer GB2 may receive the global clock signal GCK, and generate the first distributed clock signal BCK1 by buffering the global clock signal GCK. The second global buffer GB2 may be fully activated in the first and second operation modes. The second global buffer GB2 may receive the first global enable signal ENA0 and the second global enable signal ENA1. The second global enable signal ENA1 may remain enabled in both the first and second operation modes. The second global buffer GB2 may be fully activated by receiving the enabled first and second global enable signals ENA0 and ENA1 in the second operation mode.

The third global buffer GB3 may receive the global clock signal GCK, and generate the second distributed clock signal BCK2 by buffering the global clock signal GCK. The third global buffer GB3 may be fully activated in the first operation mode, and may be partially activated in the second operation mode. The third global buffer GB3 may receive the first global enable signal ENA0 and the third global enable signal ENB1. The third global enable signal ENB1 may be enabled in the first operation mode and disabled in the second operation mode. The third global buffer GB3 may be partially activated by receiving the enabled first global enable signal ENA0 in the second operation mode and the disabled third global enable signal ENB1 in the second operation mode.

The fourth global buffer GB4 may receive the global clock signal GCK, and generate the third distributed clock signal BCK3 by buffering the global clock signal GCK. The fourth global buffer GB4 may be fully activated in the first operation mode, and may be partially activated in the second operation mode. The fourth global buffer GB4 may receive the first global enable signal ENA0 and the fourth global enable signal ENC1. The fourth global enable signal ENC1 may be enabled in the first operation mode and disabled in the second operation mode. The fourth global buffer GB4 may be partially activated by receiving the enabled first global enable signal ENA0 in the second operation mode and the disabled fourth global enable signal ENC1 in the second operation mode.

The global clock path 210 may further include a fifth global buffer GB5, a sixth global buffer GB6, and a seventh global buffer GB7. The fifth global buffer GB5 may receive an output signal of the second global buffer GB2, and generate the first distributed clock signal BCK1 by buffering the output signal of the second global buffer GB2. The fifth global buffer GB5 may be fully activated in the first and second operation modes. The fifth global buffer GB5 may receive the second global enable signal ENA1. The fifth global buffer GB5 may be fully activated in both the first and second operation modes based on the second global enable signal ENA1.

The sixth global buffer GB6 may receive an output signal of the third global buffer GB3, and generate the second distributed clock signal BCK2 by buffering the output signal of the third global buffer GB3. The sixth global buffer GB6 may be fully activated in the first operation mode and deactivated in the second operation mode. The sixth global buffer GB6 may receive the third global enable signal ENB1. Based on the third global enable signal ENB1, the sixth global buffer GB6 may be activated in the first operation mode and deactivated in the second operation mode.

The seventh global buffer GB7 may receive an output signal of the fourth global buffer GB4, and generate the third distributed clock signal BCK3 by buffering the output signal of the fourth global buffer GB4. The seventh global buffer GB7 may be fully activated in the first operation mode and deactivated in the second operation mode. The seventh global buffer GB7 may receive the fourth global enable signal ENC1. Based on the fourth global enable signal ENC1, the seventh global buffer GB7 may be activated in the first operation mode and deactivated in the second operation mode.

The second to fourth global buffers GB2 to GB4 may serve as branch points A where the global clock signal GCK is received in common and is distributed. While the operation mode is switched, the load of the branch point A may be changed according to whether a buffer connected to the branch point A is activated. As in the embodiment described above, all the first to third distributed clock signals BCK1 to BCK3 are used in the first operation mode, but when only the first distributed clock signal BCK1 is used in the second operation mode, the second global buffer GB2 may be activated in both the first and second operation modes, and the third and fourth global buffers GB3 and GB4 may be activated in the first operation mode but deactivated in the second operation mode to reduce power consumption of the clock distribution network 200. However, while the load of the branch point A in the first operation mode is determined by three activated global buffers, the load of the branch point A in the second operation mode may be determined by one activated global buffer and two deactivated global buffers. Accordingly, when the first operation mode is switched to the second operation mode or vice versa, the load of the branch point A may be greatly changed, and the change in the load of the branch point A may be a factor that changes the phase of the first distributed clock signal BCK1. When the phase of the first distributed clock signal BCK1 changes according to the switching of the operation mode, a clock distribution network and a semiconductor apparatus including the clock distribution network may have a difficulty in exhibiting constant performance. The clock distribution network 200 may partially activate, without deactivating, a buffer that generates no distributed clock signal in the second operation mode among buffers connected to the branch point A. In the second operation mode, the third and fourth global buffers GB3 and GB4 may be partially activated, and the load of the branch point A may be determined by one activated buffer and two partially activated buffers. Accordingly, the difference between the load of the branch point A in the first operation mode and the load of the branch point A in the second operation mode may be reduced, and changes in the phase of the first distributed clock signal BCK1 may also be alleviated. As a result, while the power consumption of the clock distribution network 200 is reduced in the second operation mode, the clock distribution network 200 and the semiconductor apparatus including the clock distribution network 200 may maintain constant performance regardless of the operation mode.

The first local clock path 221 may include a first local buffer LB1 and a second local buffer LB2. The first local buffer LB1 may receive the first distributed clock signal BCK1, and generate the first local clock signal LCK1 by buffering the first distributed clock signal BCK1. The first local buffer LB1 may be fully activated in the first and second operation modes. The first local buffer LB1 may receive the second global enable signal ENA1 and the first local enable signal ENA2. The second global enable signal ENA1 and the first local enable signal ENA2 may remain enabled in both the first and second operation modes. The first local buffer LB1 may be fully activated by receiving the enabled second global enable signal ENA1 and first local enable signal ENA2 in the second operation mode.

The second local buffer LB2 may receive the first distributed clock signal BCK1, and generate the second local clock signal LCK2 by buffering the first distributed clock signal BCK1. The second local buffer LB2 may be fully activated in the first operation mode and partially activated in the second operation mode. The second local buffer LB2 may receive the second global enable signal ENA1 and the second local enable signal ENB2. The second local enable signal ENB2 may be enabled in the first operation mode and disabled in the second operation mode. The second local buffer LB2 may be partially activated by receiving the enabled second global enable signal ENA1 in the second operation mode and the disabled second local enable signal ENB2 in the second operation mode.

The first local clock path 221 may further include a third local buffer LB3 and a fourth local buffer LB4. The third local buffer LB3 may receive an output signal of the first local buffer LB1, and generate the first local clock signal LCK1 by buffering the output signal of the first local buffer LB1. The third local buffer LB3 may be fully activated in both the first and second operation modes. The third local buffer LB3 may receive the first local enable signal ENA2. The third local buffer LB3 may be activated in both the first and second operation modes based on the first local enable signal ENA2.

The fourth local buffer LB4 may receive an output signal of the second local buffer LB2, and generate the second local clock signal LCK2 by buffering the output signal of the second local buffer LB2. The fourth local buffer LB4 may be fully activated in the first operation mode and deactivated in the second operation mode. The fourth local buffer LB2 may receive the second local enable signal ENB2. The fourth local buffer LB2 may be activated in the first operation mode and deactivated in the second operation mode based on the second local enable signal ENB2.

The first and second local buffers LB1 and LB2 may be branch points B where the first distributed clock signal BCK1 is received and distributed. While the operation mode is switched, the load of the branch point B may be changed according to whether a buffer connected to the branch point B is activated. As in the embodiment described above, when both the first and second local clock signals LCK1 and LCK2 are used in the first operation mode, but only the first local clock signal LCK1 is used in the second operation mode, the second global buffer LB2 may be partially activated without being deactivated in the second operation mode. In the second operation mode, the load of the branch point B may be determined by one activated local buffer and two partially activated local buffers. Accordingly, while the power consumption of the clock distribution network 200 is reduced in the second operation mode, changes in the load of the branch point B may be reduced according to the switching of the operation mode.

The second local clock path 222 may include a fifth local buffer LB5 and a sixth local buffer LB6. The fifth local buffer LB5 may receive the second distributed clock signal BCK2, and generate the third local clock signal LCK3 by buffering the second distributed clock signal BCK2. The fifth local buffer LB5 may be fully activated in the first operation mode and deactivated in the second operation mode. The fifth local buffer LB5 may receive the third global enable signal ENB1 and the third local enable signal ENC2. The third global enable signal ENB1 and the third local enable signal ENC2 may be enabled in the first operation mode and disabled in the second operation mode. The fifth local buffer LB5 may be deactivated by receiving the disabled third global enable signal ENB1 and third local enable signal ENC2 in the second operation mode.

The sixth local buffer LB6 may receive the second distributed clock signal BCK2, and generate the fourth local clock signal LCK4 by buffering the second distributed clock signal BCK2. The sixth local buffer LB6 may be fully activated in the first operation mode and deactivated in the second operation mode. The sixth local buffer LB6 may receive the third global enable signal ENB1 and the fourth local enable signal END2. The fourth local enable signal END2 may be enabled in the first operation mode and disabled in the second operation mode. The sixth local buffer LB6 may be deactivated by receiving the disabled third global enable signal ENB1 and fourth local enable signal END2 in the second operation mode.

The second local clock path 222 may further include a seventh local buffer LB7 and an eighth local buffer LB8. The seventh local buffer LB7 may receive an output signal of the fifth local buffer LB5, and generate the third local clock signal LCK3 by buffering the output signal of the fifth local buffer LB5. The seventh local buffer LB7 may be fully activated in the first operation mode and deactivated in the second operation mode. The seventh local buffer LB7 may receive the third local enable signal ENC2. The seventh local buffer LB7 may be activated in the first operation mode and deactivated in the second operation mode based on the third local enable signal ENC2.

The eighth local buffer LB8 may receive an output signal of the sixth local buffer LB6, and generate the fourth local clock signal LCK4 by buffering the output signal of the sixth local buffer LB6. The eighth local buffer LB8 may be fully activated in the first operation mode and deactivated in the second operation mode. The eighth local buffer LB8 may receive the fourth local enable signal END2. The eighth local buffer LB8 may be activated in the first operation mode and deactivated in the second operation mode based on the fourth local enable signal END2.

The fifth and sixth local buffers LB5 and LB6 may be branch points where the second distributed clock signal BCK2 is received in common and distributed. However, because the third and fourth local clock signals LCK3 and LCK4 are not used in the second operation mode, the fifth and sixth local buffers LB5 and LB6 need not to be partially activated in the second operation mode, and may be deactivated to minimize power consumption. When any one of the third and fourth local clock signals LCK3 and LCK4 is used in the second operation mode, one of the fifth and sixth local buffers LB5 and LB6 may be fully activated and the other one thereof may be partially activated in the second operation mode.

The third local clock path 223 may include a ninth local buffer LB9 and a tenth local buffer LB10. The ninth local buffer LB9 may receive the third distributed clock signal BCK3, and generate the fifth local clock signal LCK5 by buffering the third distributed clock signal BCK3. The ninth local buffer LB9 may be fully activated in the first operation mode and deactivated in the second operation mode. The ninth local buffer LB9 may receive the fourth global enable signal ENC1 and the fifth local enable signal ENE2. The fourth global enable signal ENC1 and the fifth local enable signal ENE2 may be enabled in the first operation mode and disabled in the second operation mode. The ninth local buffer LB9 may be deactivated by receiving the disabled fourth global enable signal ENC1 and fifth local enable signal ENE2 in the second operation mode.

The tenth local buffer LB10 may receive the third distributed clock signal BCK3, and generate the sixth local clock signal LCK6 by buffering the third distributed clock signal BCK3. The tenth local buffer LB10 may be fully activated in the first operation mode and deactivated in the second operation mode. The tenth local buffer LB10 may receive the fourth global enable signal ENC1 and the sixth local enable signal ENF2. The sixth local enable signal ENF2 may be enabled in the first operation mode and disabled in the second operation mode. The tenth local buffer LB10 may be deactivated by receiving the disabled fourth global enable signal ENC1 and sixth local enable signal ENF2 in the second operation mode.

The third local clock path 223 may further include an eleventh local buffer LB11 and a twelfth local buffer LB12. The eleventh local buffer LB11 may receive an output signal of the ninth local buffer LB9, and generate the fifth local clock signal LCK5 by buffering the output signal of the ninth local buffer LB9. The eleventh local buffer LB11 may be fully activated in the first operation mode and deactivated in the second operation mode. The eleventh local buffer LB11 may receive the fifth local enable signal ENE2. The eleventh local buffer LB11 may be activated in the first operation mode and deactivated in the second operation mode based on the fifth local enable signal ENE2.

The twelfth local buffer LB12 may receive an output signal of the tenth local buffer LB10, and generate the sixth local clock signal LCK6 by buffering the output signal of the tenth local buffer LB10. The twelfth local buffer LB12 may be fully activated in the first operation mode and deactivated in the second operation mode. The twelfth local buffer LB12 may receive the sixth local enable signal ENF2. The twelfth local buffer LB12 may be activated in the first operation mode and deactivated in the second operation mode based on the sixth local enable signal ENF2.

The ninth and tenth local buffers LB9 and LB10 may be branch points where the third distributed clock signal BCK3 is received in common and distributed. However, because the fifth and sixth local clock signals LCK5 and LCK6 are not used in the second operation mode, the ninth and tenth local buffers LB9 and LB10 need not to be partially activated in the second operation mode, and may be deactivated to minimize power consumption. When any one of the fifth and sixth local clock signals LCK5 and LCK6 is used in the second operation mode, one of the ninth and tenth local buffers LB9 and LB10 may be fully activated and the other one thereof may be partially activated in the second operation mode.

The clock distribution network 200 may be applied as the clock distribution network 122 illustrated in FIG. 1. When the clock distribution network 200 is applied to the clock distribution network 122 of FIG. 1, the first local clock signal LCK1 may be a data clock signal DCK transmitted to the strobe transmission circuit 124, and the second local clock signal LCK may be a data clock signal DCK transmitted to the data input/output circuit 125. In an embodiment, the clock distribution network 200 may generate a differential clock signal by buffering a differential clock signal. For example, the reference clock signal CK may be input to the global clock path 210 together with the complementary signal CKB, and the first to third distributed clock signals BCK1 to BCK3 may be generated as differential signals together with the complementary signals BCK1B to BCK3B, respectively. Similarly, the first to sixth local clock signals LCK1 to LCK6 may be generated as differential signals together with complementary signals LCK1B to LCK6B, respectively.

Figure 3:
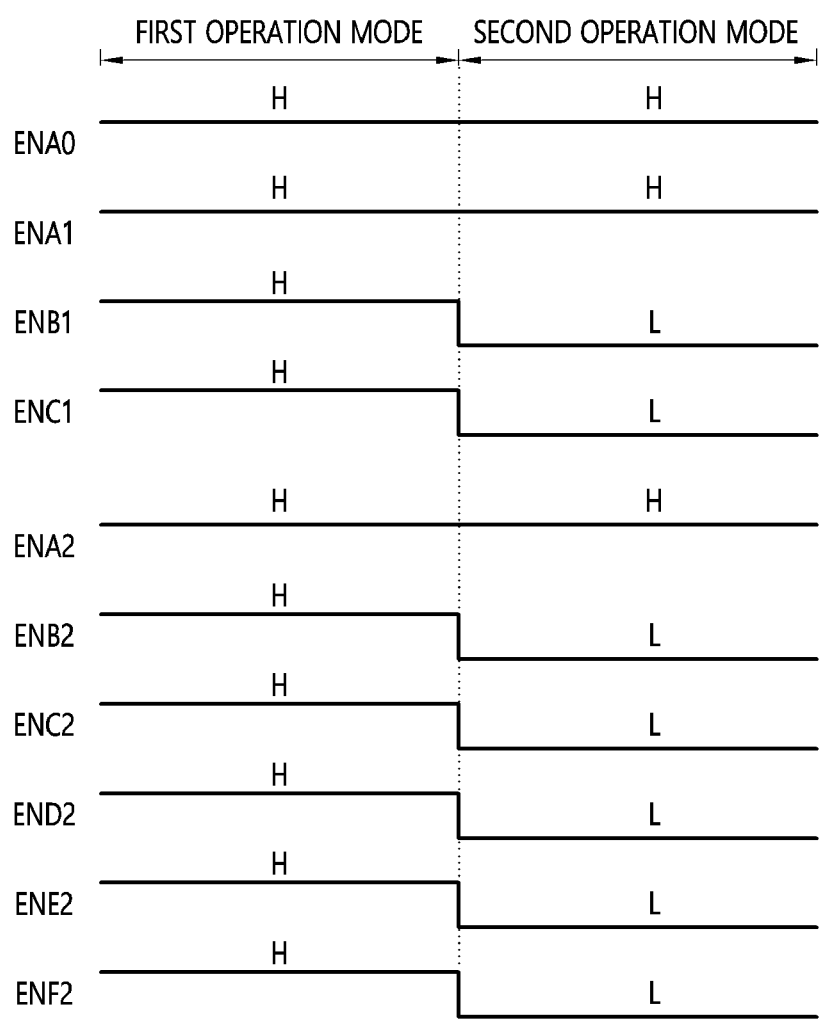
FIG. 3 is a timing diagram illustrating logic levels of enable signals generated according to an operation mode.
Figure 4:
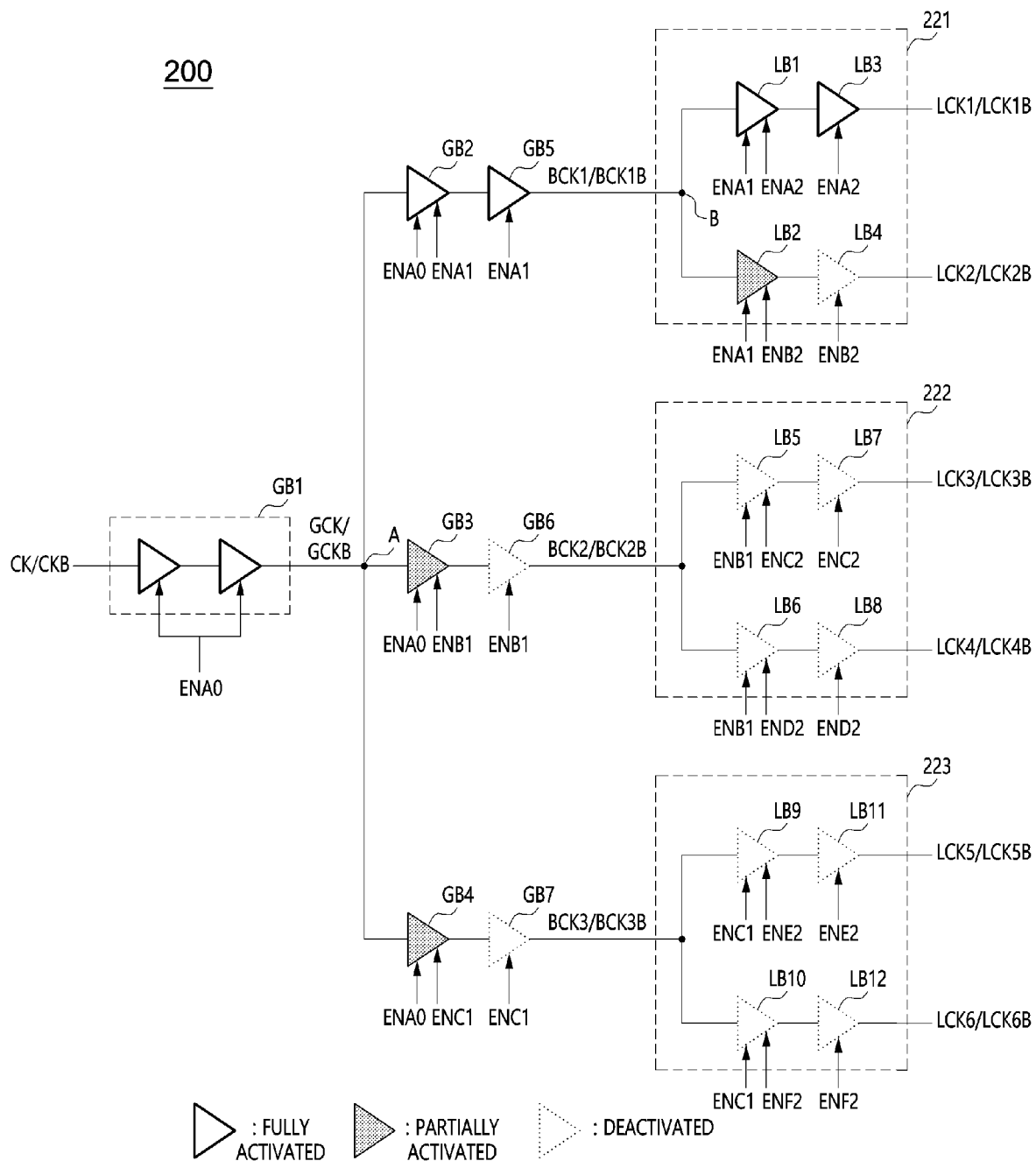
FIG. 4 is a diagram illustrating an operation of the clock distribution network in accordance with an embodiment in a second operation mode.

FIG. 3 is a timing diagram illustrating logic levels of enable signals generated according to an operation mode, and FIG. 4 is a diagram illustrating an operation of the clock distribution network 200 in accordance with an embodiment in the second operation mode. Referring to FIG. 3, in the first operation mode, the first to fourth global enable signals ENA0, ENA1, ENB1, and ENC1 and the first to sixth local enable signals ENA2, ENB2, ENC2, END2, ENE2, and ENF2 may all have a high logic level. When the operation mode is switched from the first operation mode to the second operation mode, the first and second global enable signals ENA0 and ENA1 may maintain a high logic level, and the logic levels of the third and fourth global enable signals ENB1 and ENC1 may transition from a high logic level to a low logic level. The first local enable signal ENA2 may maintain a high logic level, and the logic levels of the second to sixth local enable signals ENB2, ENC2, END2, ENE2, and ENF2 may transition from a high logic level to a low logic level.

In the first operation mode, the first to seventh global buffers GB1 to GB7 and the first to twelfth local buffers LB1 to LB12 may all be fully activated. The clock distribution network 200 may generate all the first to sixth local clock signals LCK1 to LCK6. In the second operation mode, the clock distribution network 200 may generate the first local clock signal LCK1, and might not generate the second to sixth local clock signals LCK2 to LCK6. Accordingly, the clock distribution network 200 may activate a path for generating the global clock signal GCK, the first distributed clock signal BCK1, and the first local clock signal LCK1. Referring to FIG. 4, when the operation mode is switched from the first operation mode to the second operation mode, the first global buffer GB1, the second global buffer GB2, the fifth global buffer GB5, the first local buffer LB1, and the third local buffer LB3 may remain fully activated. The third global buffer GB3, the fourth global buffer GB4, and the second local buffer LB2 may be partially activated. The sixth global buffer GB6, the seventh global buffer GB7, and the fourth to twelfth local buffers LB4 to LB12 may be deactivated. Because the third and fourth global buffers GB3 and GB4 are partially activated in the second operation mode, changes in the load of the branch point A where the second to fourth global buffers GB2 to GB4 receive the global clock signal GCK might not be large. Similarly, because the second local buffer LB2 is partially activated in the second operation mode, changes in the load of the branch point B where the first and second local buffers LB1 and LB2 receive the first distributed clock signal BCK1 might not be large. Accordingly, the clock distribution network 200 may generate the first local clock signal LCK1 with a small phase change even though the operation mode is switched.

Figure 5A:
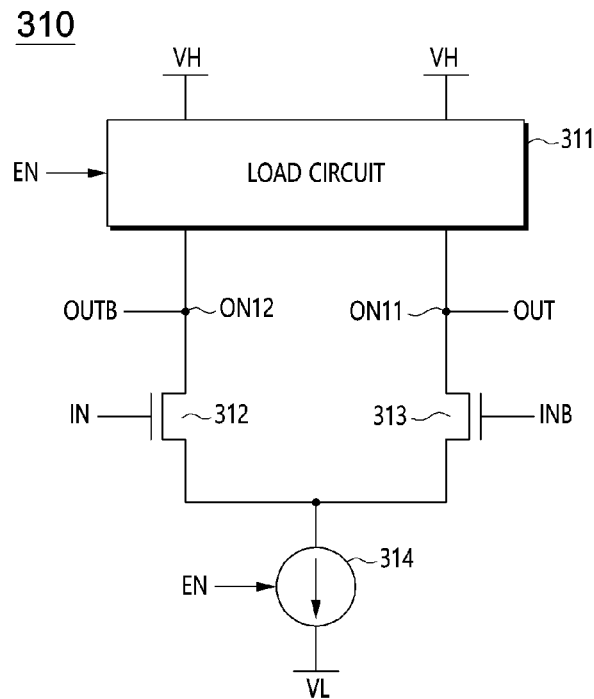
FIG. 5A is a diagram illustrating a configuration of a buffer in accordance with an embodiment.

FIG. 5A is a diagram illustrating the configuration of a buffer 310 in accordance with an embodiment. Referring to FIG. 5A, the buffer 310 may be a current mode logic (CML) buffer. The buffer 310 may receive one enable signal EN, and may be fully activated or deactivated based on the one enable signal EN. The buffer 310 may be applied as at least one of the first global buffer GB1, the fifth global buffer GB5, the sixth global buffer GB6, the seventh global buffer GB7, the third local buffer LB3, the fourth local buffer LB4, the seventh local buffer LB7, the eighth local buffer LB8, the eleventh local buffer LB11, and the twelfth local buffer LB12 illustrated in FIG. 2. The buffer 310 may include a load circuit 311, a first transistor 312, a second transistor 313, and a current source 314. The load circuit 311 may provide a first voltage VH to a first output node ON11 and a second output node ON12 based on the enable signal EN. When the enable signal EN is enabled, the load circuit 311 may apply the first voltage VH to the first and second output nodes ON11 and ON12. When the enable signal EN is disabled, the load circuit 311 might not apply the first voltage VH to the first and second output nodes ON11 and ON12. The first and second transistors 312 and 313 may be N-channel MOS transistors. A gate of the first transistor 312 may receive an input signal IN, a drain of the first transistor 312 may be connected to the second output node ON12, and a source of the first transistor 312 may be connected to the current source 314. A gate of the second transistor 313 may receive a complementary signal INB of the input signal, a drain of the second transistor 313 may be connected to the first output node ON11, and a source of the second transistor 313 may be connected to the current source 314. A first output signal OUT may be output from the first output node ON11 and a second output signal OUTB may be output from the second output node ON12. The second output signal OUTB may be a complementary signal of the first output signal OUT. Based on the enable signal EN, the current source 314 may form a current path from the sources of the first and second transistors 312 and 313 to a terminal to which a second voltage VL is supplied. The second voltage VL may have a lower voltage level than the first voltage VH. When the enable signal EN is enabled, the current source 314 may form the current path from the first and second transistors 312 and 313 to the terminal to which the second voltage VL is supplied. When the enable signal EN is disabled, the current source 314 may block the current path. For example, when the buffer 310 is applied as the fifth global buffer GB5, the enable signal EN may correspond to the third global enable signal ENB1, the input signal IN may correspond to the output signal of the third global buffer GB3, and the first output signal OUT may correspond to the second distributed clock signal BCK2.

Figure 5B:
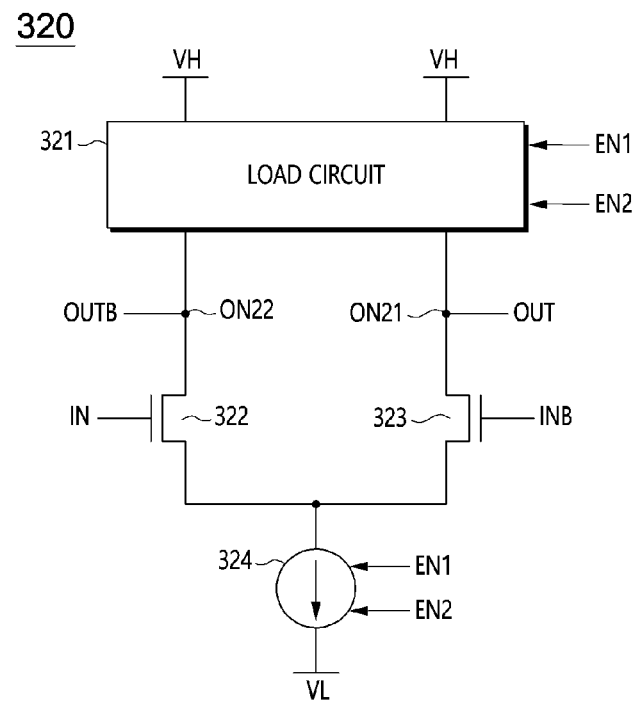
FIG. 5B is a diagram illustrating a configuration of a buffer in accordance with an embodiment.

FIG. 5B is a diagram illustrating the configuration of a buffer 320 in accordance with an embodiment. Referring to FIG. 5B, the buffer 320 may be a CML buffer. The buffer 320 may receive two enable signals EN1 and EN2, and may be fully activated, partially activated, or deactivated based on the two enable signals EN1 and EN2. The buffer 320 may be applied as at least one of the second global buffer GB2, the third global buffer GB3, the fourth global buffer GB4, the first local buffer LB1, the second local buffer LB2, the fifth local buffer LB5, the sixth local buffer LB6, the ninth local buffer LB9, and the tenth local buffer LB10 illustrated in FIG. 2. The buffer 320 may include a load circuit 321, a first transistor 322, a second transistor 323, and a variable current source 324. The load circuit 321 may provide a first voltage VH to a first output node OUT21 and a second output node OUT22 based on a first enable signal EN1 and a second enable signal EN2. When both the first and second enable signals EN1 and EN2 are enabled, the load circuit 321 may fully apply the first voltage VH to the first and second output nodes ON21 and ON22. In such a case, a driving force by which the load circuit 321 drives the first and second output nodes ON21 and ON22 with the first voltage VH may be a first driving force. When only any one of the first and second enable signals EN1 and EN2 is enabled, the load circuit 321 may partially apply the first voltage VH to the first and second output nodes ON21 and ON22. In such a case, a driving force by which the load circuit 321 drives the first and second output nodes ON21 and ON22 with the first voltage VH may be a second driving force, and the second driving force may be smaller than the first driving force. When the first and second enable signals EN1 and EN2 are disabled, the load circuit 321 might not apply the first voltage VH to the first and second output nodes ON21 and ON22.

The first and second transistors 322 and 323 may be N-channel MOS transistors. A gate of the first transistor 322 may receive an input signal IN, a drain of the first transistor 322 may be connected to the second output node ON22, and a source of the first transistor 322 may be connected to the variable current source 324. A gate of the second transistor 323 may receive a complementary signal INB of the input signal, a drain of the second transistor 323 may be connected to the first output node ON21, and a source of the second transistor 323 may be connected to the variable current source 324. A first output signal OUT may be output from the first output node ON21 and a second output signal OUTB may be output from the second output node ON22. The second output signal OUTB may be a complementary signal of the first output signal OUT. Based on the first and second enable signals EN1 and EN2, the variable current source 324 may form a current path from the sources of the first and second transistors 322 and 323 to a terminal to which the second voltage VL is supplied. The second voltage VL may have a lower voltage level than the first voltage VH. When the first and second enable signals EN1 and EN2 are enabled, the variable current source 324 may fully form the current path from the sources of the first and second transistors 322 and 323 to the terminal to which the second voltage VL is supplied. In such a case, a first current may flow through the variable current source 324. When only any one of the first and second enable signals EN1 and EN2 is enabled, the variable current source 324 may partially form the current path from the sources of the first and second transistors 322 and 323 to the terminal to which the second voltage VL is supplied. In such a case, a second current may flow through the variable current source 324, and the second current may be smaller than the first current. When the first and second enable signals EN1 and EN2 are disabled, the variable current source 324 may block the current path.

For example, when the buffer 320 is applied as the second global buffer GB2, the first and second enable signals EN1 and EN2 may respectively correspond to the first and second global enable signals ENA0 and ENA1, the input signal IN may correspond to the global clock signal GCK, and the first output signal OUT may correspond to the output signal of the second global buffer GB2. When the buffer 320 is applied as the third global buffer GB3, the first and second enable signals EN1 and EN2 may respectively correspond to the first and third global enable signals ENA0 and ENB1, the input signal IN may correspond to the global clock signal GCK, and the first output signal OUT may correspond to the output signal of the third global buffer GB3. In an embodiment, the buffer 320 may also be applied as at least one of the first global buffer GB1, the fifth global buffer GB5, the sixth global buffer GB6, the seventh global buffer GB7, the third local buffer LB3, the fourth local buffer LB4, the seventh local buffer LB7, the eighth local buffer LB8, the eleventh local buffer LB11, and the twelfth local buffer LB12. In such a case, one enable signal received by the buffers may be applied as the first and second enable signals EN1 and EN2, respectively.

Figure 6A:
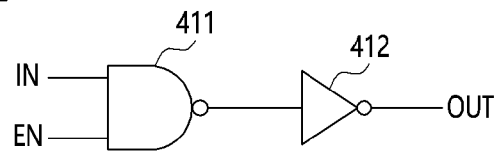
FIG. 6A is a diagram illustrating a configuration of a buffer in accordance with an embodiment.

FIG. 6A is a diagram illustrating the configuration of a buffer 410 in accordance with an embodiment. Referring to FIG. 6A, the buffer 410 may be a complementary metal-oxide-semiconductor (CMOS) buffer. The buffer 410 may receive one enable signal EN, and may be fully activated or deactivated based on the one enable signal EN. The buffer 410 may be applied as at least one of the first global buffer GB1, the fifth global buffer GB5, the sixth global buffer GB6, the seventh global buffer GB7, the third local buffer LB3, the fourth local buffer LB4, the seventh local buffer LB7, the eighth local buffer LB8, the eleventh local buffer LB11, and the twelfth local buffer LB12 illustrated in FIG. 2. The buffer 410 may include a NAND gate 411 and an inverter 412. The NAND gate 411 may receive an input signal IN and the enable signal EN. The inverter 412 may receive an output signal of the NAND gate 411, and may output an output signal OUT by inverting and driving the output signal of the NAND gate 411. When the enable signal EN is enabled to a high logic level, the buffer 410 may be fully activated, the NAND gate 411 may operate as an inverter, and a logic level of the output signal OUT may be changed according to a logic level of the input signal IN. When the enable signal EN is disabled to a low logic level, the buffer 410 may be deactivated, and the logic level of the output signal OUT may be fixed to a low logic level regardless of the input signal IN. For example, when the buffer 410 is applied as the fifth global buffer GB5, the enable signal EN may correspond to the third global enable signal ENB1, and the input signal IN may correspond to the output signal of the third global buffer GB3, and the first output signal OUT may correspond to the second distributed clock signal BCK2.

Figure 6B:
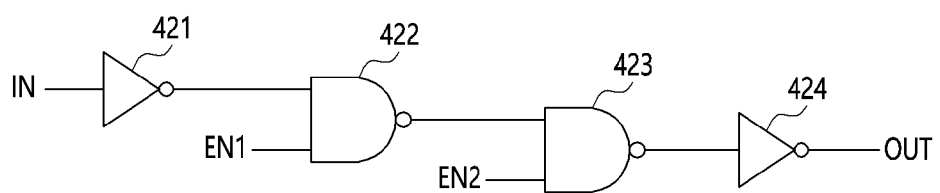
FIG. 6B is a diagram illustrating a configuration of a buffer in accordance with an embodiment.

FIG. 6B is a diagram illustrating the configuration of a buffer 420 in accordance with an embodiment. Referring to FIG. 6B, the buffer 420 may be a CMOS buffer. The buffer 420 may receive two enable signals EN1 and EN2, and may be fully activated, partially activated, or deactivated based on the two enable signals EN1 and EN2. The buffer 420 may be applied as the second global buffer GB2, the third global buffer GB3, the fourth global buffer GB4, the first local buffer LB1, the second local buffer LB2, the fifth local buffer LB5, the sixth local buffer LB6, the ninth local buffer LB9, and the tenth local buffer LB10 illustrated in FIG. 2. The buffer 420 may include a first inverter 421, a first NAND gate 422, a second NAND gate 423, and a second inverter 424. The first inverter 421 may receive an input signal IN, and invert and drive the input signal IN. The first NAND gate 422 may receive an output signal of the first inverter 421 and a first enable signal EN1. The second NAND gate 423 may receive an output signal of the first NAND gate 422 and a second enable signal EN2. The second inverter 424 may receive an output signal of the second NAND gate 423. The second inverter 424 may generate an output signal OUT by inverting and driving the output signal of the second NAND gate 423.

When the first and second enable signals EN1 and EN2 are enabled to a high logic level, the first NAND gate 422 and the second NAND gate 423 may operate as inverters, respectively. Accordingly, the buffer 420 may be fully activated, and a logic level of the output signal OUT may be changed according to a logic level of the input signal IN. When the first enable signal EN1 is enabled to a high logic level and the second enable signal EN2 is disabled to a low logic level, the first NAND gate 422 may operate as an inverter, but the output signal of the second NAND gate 423 may be fixed to a high logic level. Accordingly, the buffer 420 may be partially activated, but the logic level of the output signal OUT may be fixed to a low logic level. When both the first and second enable signals EN1 and EN2 are disabled, both the output signals of the first and second NAND gates 422 and 423 may be fixed to a high logic level. Accordingly, the buffer 420 may be deactivated and the logic level of the output signal OUT may be fixed to a low logic level.

For example, when the buffer 420 is applied as the second global buffer GB2, the first and second enable signals EN1 and EN2 may respectively correspond to the first and second global enable signals ENA0 and ENA1, the input signal IN may correspond to the global clock signal GCK, and the output signal OUT may correspond to the output signal of the second global buffer GB2. When the buffer 420 is applied as the third global buffer GB3, the first and second enable signals EN1 and EN2 may respectively correspond to the first and third global enable signals ENA0 and ENB1, the input signal IN may correspond to the global clock signal GCK, and the output signal OUT may correspond to the output signal of the third global buffer GB3. In an embodiment, the buffer 420 may also be applied as the first global buffer GB1, the fifth global buffer GB5, the sixth global buffer GB6, the seventh global buffer GB7, the third local buffer LB3, the fourth local buffer LB4, the seventh local buffer LB7, the eighth local buffer LB8, the eleventh local buffer LB11, and the twelfth local buffer LB12. In such a case, one enable signal received by the buffers may be applied as the first and second enable signals EN1 and EN2, respectively.

Figure 7:
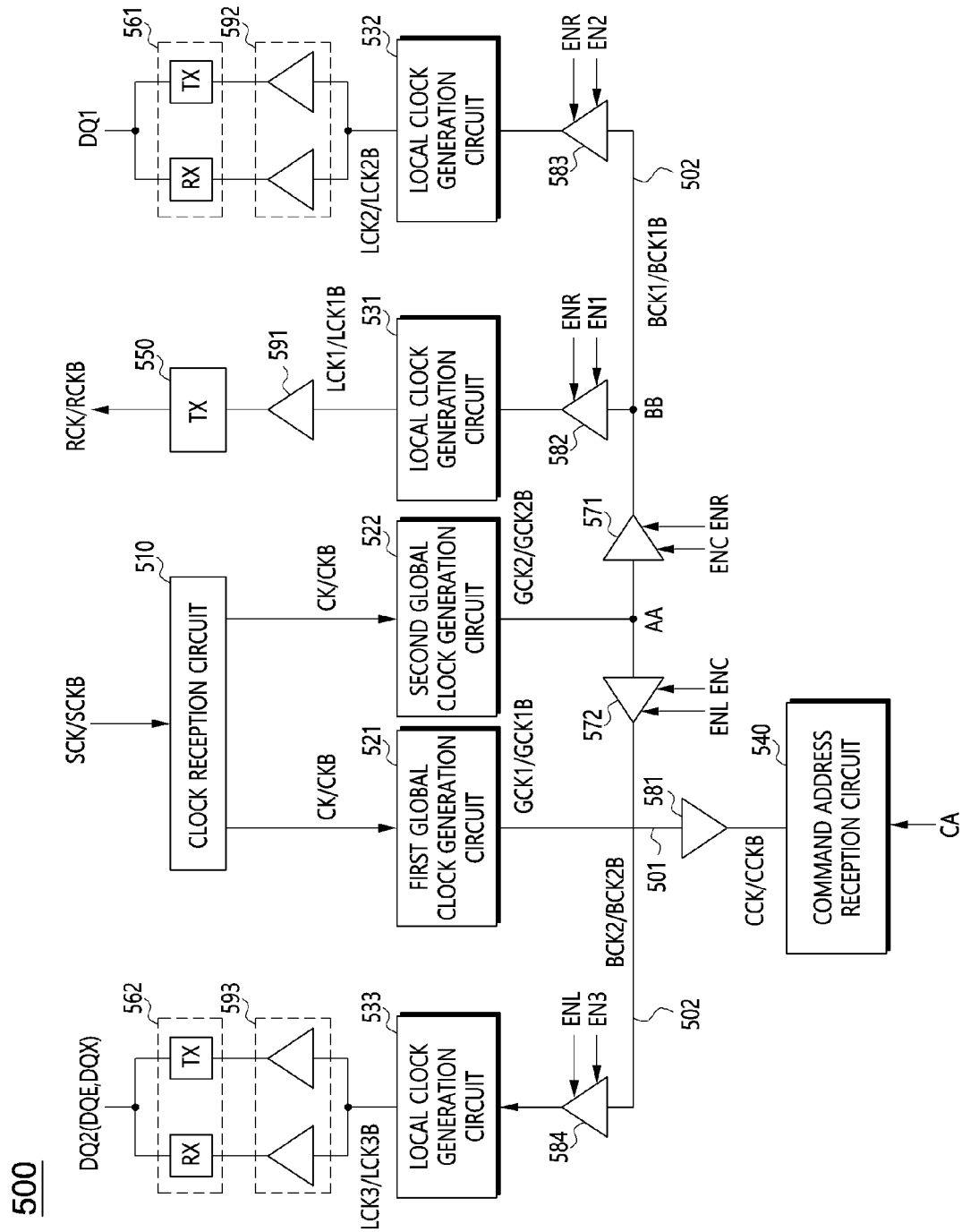
FIG. 7 is a diagram illustrating a configuration of a semiconductor apparatus in accordance with an embodiment.

FIG. 7 is a diagram illustrating the configuration of a semiconductor apparatus 500 in accordance with an embodiment. The semiconductor apparatus 500 may be applied as the second semiconductor apparatus 120 illustrated in FIG. 1. Referring to FIG. 7, the semiconductor apparatus 500 may include a clock reception circuit 510, a first global clock generation circuit 521, a second global clock generation circuit 522, a plurality of local clock generation circuits 531, 532, and 533, a command address reception circuit 540, a strobe transmission circuit 550, a plurality of data input/output circuits 561 and 562, a first global buffer 571, a second global buffer 572, a first local buffer 581, a second local buffer 582, a third local buffer 583, and a fourth local buffer 584. The first and second global clock generation circuits 521 and 522 and the first and second global buffers 571 and 572 may constitute a global clock tree and/or a global clock path. The plurality of local clock generation circuits 531 to 533 and the first to fourth local buffers 581 to 584 may constitute a local clock tree and/or a local clock path. The clock reception circuit 510, the first and second global clock generation circuits 521 and 522, the first and second global buffers 571 and 572, the plurality of local clock generation circuits 531 to 533, and the first to fourth local clock buffers 581 to 584 may constitute a clock distribution network.

The clock reception circuit 510 may receive a system clock signal SCK and a complementary signal SCKB. The clock reception circuit 510 may generate a reference clock signal pair CK and CKB by differentially amplifying the system clock signal SCK and the complementary signal SCKB. The reference clock signal pair CK and CKB may be provided to the first and second global clock generation circuits 521 and 522, respectively.

The first global clock generation circuit 521 may receive the reference clock signal pair CK and CKB from the clock reception circuit 510, and generate a first global clock signal pair GCK1 and GCK1B by buffering the reference clock signal pair CK and CKB. The first global clock signal pair GCK1 and GCK1B may be signals that swing to a CML level or a CMOS level. The first global clock generation circuit 521 may distribute and transmit the first global clock signal pair GCK1 and GCK1B to the command address reception circuit 540 through a first clock transmission line 501. In an embodiment, the first global clock generation circuit 521 may generate the first global clock signal pair GCK1 and GCK1B by dividing the reference clock signal pair CK and CKB.

The first local buffer 581 may be connected to the first clock transmission line 501, and receive the first global clock signal pair GCK1 and GCK1B transmitted from the first global clock generation circuit 521 through the first clock transmission line 501. The first local buffer 581 may generate a command clock signal pair CCK and CCKB by buffering the first global clock signal pair GCK1 and GCKB1. The first local buffer 581 may provide the command clock signal pair CCK and CCKB to the command address reception circuit 540.

The command address reception circuit 540 may be connected to the first local buffer 581, and may receive the command clock signal pair CCK and CCKB from the first local buffer 581. The command address reception circuit 540 may be connected to a command address bus through which a command address signal CA is transmitted. The command address reception circuit 540 may receive the command address signal CA, and latch the command address signal CA in synchronization with the command clock signal pair CCK and CCKB.

The second global clock generation circuit 522 may receive the reference clock signal pair CK and CKB from the clock reception circuit 510, and generate a second global clock signal pair GCK2 and GCK2B by buffering the reference clock signal pair CK and CKB. The second global clock generation circuit 522 may output the second global clock signal pair GCK2 and GCK2B through a second clock transmission line 502. The second global clock signal pair GCK2 and GCK2B may be signals that swing to a CML level or a CMOS level. The second global clock generation circuit 522 may generate the second global clock signal pair GCK2 and GCK2B having substantially the same frequencies as those of the reference clock signal pair without dividing the reference clock signal pair CK and CKB. The second global clock signal pair GCK2 and GCK2B may have higher frequencies than the first global clock signal pair GCK1 and GCK1B. In an embodiment, the second global clock generation circuit 522 may also generate the second global clock signal pair GCK2 and GCK2B having higher frequencies than the reference clock signal pair CK and CKB by multiplying the frequencies of the reference clock signal pair CK and CKB.

The first and second global buffers 571 and 572 may receive the second global clock signal pair GCK2 and GCK2B from the second global clock generation circuit 522 in common. The first and second global buffers 571 and 572 may buffer the second global clock signal pair GCK2 and GCK2B, and distribute and transmit the buffered second global clock signal pair GCK2 and GCK2B to the plurality of local clock generation circuits 531 to 533 connected to the strobe transmission circuit 550 and the data input/output circuits 561 and 562. The first global buffer 571 may generate a first distributed clock signal pair BCK1 and BCK1B by buffering the second global clock signal pair GCK2 and GCK2B, and provide the first distributed clock signal pair BCK1 and BCK1B to a first clock path. The first clock path may include the second clock transmission line 502, which is located on the right side of a branch point AA where the first and second global buffers 571 and 572 receive the second global clock signal pair GCK2 and GCK2B in common, and the second and third local buffers 582 and 583 connected to the second clock transmission line 502 on the right side. The second global buffer 572 may generate a second distributed clock signal pair BCK2 and BCK2B by buffering the second global clock signal pair GCK2 and GCK2B, and provide the second distributed clock signal pair BCK2 and BCK2B to a second clock path. The second clock path may include the second clock transmission line 502 located on the left side of the branch point AA and the fourth local buffer 584 connected to the second clock transmission line 502 on the left side.

The second local buffer 582 may receive the first distributed clock signal pair BCK1 and BCK1B from the first global buffer 571. The second local buffer 582 may buffer the first distributed clock signal pair BCK1 and BCK1B. The second local buffer 582 may provide the buffered first distributed clock signal pair BCK1 and BCK1B to the local clock generation circuit 531. The third local buffer 583 may receive the first distributed clock signal pair BCK1 and BCK1B from the first global buffer 571. The third local buffer 583 may buffer the first distributed clock signal pair BCK1 and BCK1B. The third local buffer 583 may provide the buffered first distributed clock signal pair BCK1 and BCK1B to the local clock generation circuit 532. The fourth local buffer 584 may receive the second distributed clock signal pair BCK2 and BCK2B from the second global buffer 572. The fourth local buffer 584 may buffer the second distributed clock signal pair BCK2 and BCK2B. The fourth local buffer 584 may provide the buffered second distributed clock signal pair BCK2 and BCK2B to the local clock generation circuit 533.

The local clock generation circuit 531 may be connected to the second local buffer 582 and the strobe transmission circuit 550. The local clock generation circuit 531 may receive the buffered first distributed clock signals BCK1 and BCK1B through the second local buffer 582. The local clock generation circuit 531 may generate a first local clock signal pair LCK1 and LCK1B by buffering the first distributed clock signal pair BCK1 and BCK1B. The local clock generation circuit 531 may provide the first local clock signal pair LCK1 and LCK1B to the strobe transmission circuit 550. The semiconductor apparatus 500 may further include a buffer 591 to buffer the first local clock signal pair LCK1 and LCK1B transmitted from the local clock generation circuit 531 to the strobe transmission circuit 550. In an embodiment, when the second global clock signal pair GCK2 and GCK2B and the first distributed clock signal pair BCK1 and BCK1B each have a CML level, the local clock generation circuit 531 may include a CML to CMOS converter to generate the first local clock signal pair LCK1 and LCK1B having a CMOS level.

The strobe transmission circuit 550 may include a strobe transmitter TX. The strobe transmitter TX may receive the first pair of local clock signals LCK1 and LCK1B from the local clock generation circuit 531. The strobe transmitter TX may be connected to a strobe bus through which data strobe signals RCK and RCKB are transmitted. The data strobe signals RCK and RCKB may be synchronized with data DQ1, DQ2, DQE, or DQX transmitted through the strobe transmitter TX. The strobe transmitter TX may generate the data strobe signals RCK and RCKB from the first local clock signal pair LCK1 and LCK1B, and transmit the data strobe signals RCK and RCKB through the strobe bus.

The local clock generation circuit 532 may be connected to the third local buffer 583 and the data input/output circuit 561. The local clock generation circuit 532 may receive the buffered first distributed clock signal pair BCK1 and BCK1B through the third local buffer 583. The local clock generation circuit 532 may generate a second local clock signal pair LCK2 and LCK2B by buffering the first distributed clock signal pair BCK1 and BCK1B. The local clock generation circuit 532 may provide the second local clock signal pair LCK2 and LCK2B to the data input/output circuit 561. The semiconductor apparatus 500 may further include a buffer 592 to buffer the second local clock signal pair LCK2 and LCK2B transmitted from the local clock generation circuit 532 to the data input/output circuit 561. In an embodiment, when the second global clock signal pair GCK2 and GCK2B and the first distributed clock signal pair BCK1 and BCK2B each have a CML level, the local clock generation circuit 532 may include a CML to CMOS converter to generate the second local clock signal pair LCK2 and LCK2B having a CMOS level.

The data input/output circuit 561 may include a data receiver RX and a data transmitter TX. The data receiver RX and the data transmitter TX may each receive the second local clock signal pair LCK2 and LCK2B from the local clock generation circuit 532. The data receiver RX and the data transmitter TX may be connected in common to a data bus through which data DQ1 is transmitted. The data receiver RX may receive the data DQ1 transmitted through the data bus in synchronization with the second local clock signal pair LCK2 and LCK2B. The data transmitter TX may transmit the data DQ1 through the data bus in synchronization with the second local clock signal pair LCK2 and LCK2B.

The local clock generation circuit 533 may be connected to the fourth local buffer 584 and the data input/output circuit 562. The local clock generation circuit 533 may receive the buffered second distributed clock signal pair BCK2 and BCK2B through the fourth local buffer 584. The local clock generation circuit 533 may generate a third local clock signal pair LCK3 and LCK3B by buffering the second distributed clock signal pair BCK2 and BCK2B. The local clock generation circuit 533 may provide the third local clock signal pair LCK3 and LCK3B to the data input/output circuit 562. The semiconductor apparatus 500 may further include a buffer 593 to buffer the third local clock signal pair LCK3 and LCK3B transmitted from the local clock generation circuit 533 to the data input/output circuit 562. In an embodiment, when the second global clock signal pair GCK2 and GCK2B and the second distributed clock signal pair BCK2 and BCK2B each have a CML level, the local clock generation circuit 533 may include a CML to CMOS converter to generate the third local clock signal pair LCK3 and LCK3B having a CMOS level.

The data input/output circuit 562 may include a data receiver RX and a data transmitter TX. The data receiver RX and the data transmitter TX may each receive the third local clock signal pair LCK3 and LCK3B from the local clock generation circuit 533. The data receiver RX and the data transmitter TX may be connected in common to a data bus through which data DQ2 is transmitted. The data receiver RX may receive the data DQ2 transmitted through the data bus in synchronization with the third local clock signal pair LCK3 and LCK3B. The data transmitter TX may transmit the data DQ2 through the data bus in synchronization with the third local clock signal pair LCK3 and LCK3B. In an embodiment, the data input/output circuit 562 may be an extended data input/output circuit, and bandwidth extension data DQE or DQX may be transmitted and received through the extended data input/output circuit. The extension data DQE or DQX may be another type of data signal added to extend a data bandwidth of the semiconductor apparatus 500.

Figure 8:
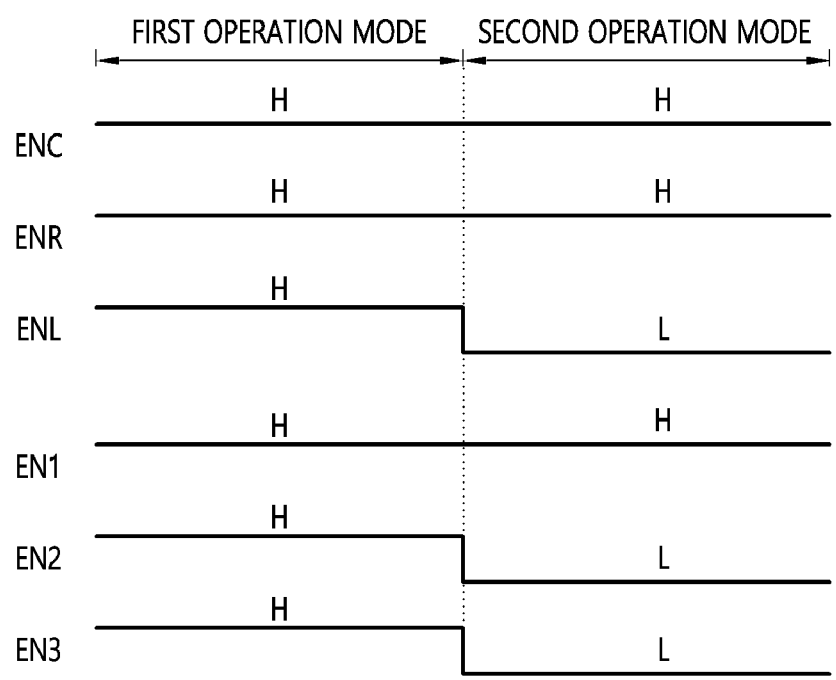
FIG. 8 is a timing diagram illustrating logic levels of enable signals for activating global buffers and local buffers illustrated in FIG. 7.

FIG. 8 is a timing diagram illustrating logic levels of enable signals for activating the global buffers and the local buffers illustrated in FIG. 7. Referring to FIGS. 7 and 8, the semiconductor apparatus 500 may generate the command clock signal pair CCK and CCKB and the first local clock signal pair LCK1 and LCK1B regardless of an operation mode. The semiconductor apparatus 500 may generate the second local clock signal pair LCK2 and LCK2B and the third local clock signal pair LCK3 and LCK3B in a first operation mode, and might not generate the second local clock signal pair LCK2 and LCK2B and the third local clock signal pair LCK3 and LCK3B in a second operation mode. The first global buffer 571 may receive a first global enable signal ENC and a second global enable signal ENR, and may be activated based on the first and second global enable signals ENC and ENR. The second global buffer 572 may receive the first global enable signal ENC and a third global enable signal ENL, and may be activated based on the first and third global enable signals ENC and ENL. The second local buffer 582 may receive the second global enable signal ENR and a first local enable signal EN1, and may be activated based on the second global enable signal ENR and the first local enable signal EN1. The third local buffer 583 may receive the second global enable signal ENR and a second local enable signal EN2, and may be activated based on the second global enable signal ENR and the second local enable signal EN2. The fourth local buffer 584 may receive the third global enable signal ENL and a third local enable signal EN3, and may be activated based on the third global enable signal ENL and the third local enable signal EN3. The semiconductor apparatus 500 may further include a component corresponding to the clock control circuit 126 of FIG. 1, and the first to third global enable signals ENC, ENR, and ENL and the first to third global enable signals EN1 to EN3 may be generated from the clock control circuit.

In the first operation mode, the semiconductor apparatus 500 may enable all the first to third global enable signals ENC, ENR, and ENL and the first to third local enable signals EN1 to EN3 to a high logic level. In the second operation mode, the semiconductor apparatus 500 may maintain the enabled states of the first global enable signal ENC, the second global enable signal ENR, and the first local enable signal EN1, and disable the third global enable signal ENL, the second local enable signal EN2, and the third local enable signal EN3 to a low logic level. In the first operation mode, the first and second global buffers 571 and 572 and the second to fourth local buffers 582 to 584 may all be fully activated, thereby generating the first distributed clock signal pair BCK1 and BCK1B, the second distributed clock signal pair BCK2 and BCK2B, the first local clock signal pair LCK1 and LCK1B, the second local clock signal pair LCK2 and LCK2B, and the third local clock signal pair LCK3 and LCK3B. In the second operation mode, the first global buffer 571 may be fully activated based on the first and second global enable signals ENC and ENR, and the second global buffer 572 may be partially activated based on the first and third global enable signals ENC and ENL. The second local buffer 582 may be fully activated based on the second global enable signal ENR and the first local enable signal EN1, and the third local buffer 583 may be partially activated based on the second global enable signal ENR and the second local enable signal EN2. The fourth local buffer 584 may be deactivated based on the third global enable signal ENL and the third local enable signal EN3.

The first and second global buffers 571 and 572 may be disposed at the branch point AA where the second global clock signal pair GCK2 and GCK2B is received in common and the first distributed clock signal pair BCK1 and BCK1B and the second distributed clock signal pair BCK2 and BCK2B are distributed. When the operation mode is switched from the first operation mode to the second operation mode, because the second global buffer 572 is not deactivated but partially activated, changes in the load of the branch point AA may be reduced. Accordingly, changes in the phase of the first distributed clock signal pair BCK1 and BCK1B generated through the first global buffer 571 may be alleviated. The second and third local buffers 582 and 583 may be disposed at the branch point BB where the first distributed clock signal pair BCK1 and BCK1B is received in common and the first distributed clock signal pair BCK1 and BCK1B are distributed to the local clock generation circuits 531 and 532. When the operation mode is switched from the first operation mode to the second operation mode, because the third local buffer 583 is partially activated without being deactivated, changes in the load of the branch point BB may be reduced. Accordingly, a phase change between the output signal output through the second local buffer 582 and the first local clock signal pair LCK1 and LCK1B generated through the local clock generation circuit 531 may be alleviated.

A person skilled in the art to which the present disclosure pertains will understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that all changes or modified forms derived from the meaning and scope of the claims and the equivalent concept thereof are included in the scope of the present disclosure.

What is claimed is:

1. A clock distribution network comprising:
a first global buffer configured to receive a global clock signal, to generate a first distributed clock signal from the global clock signal, and to be fully activated in a first operation mode and a second operation mode; and
a second global buffer configured to receive the global clock signal, to generate a second distributed clock signal from the global clock signal, to be fully activated in the first operation mode, and to be partially activated in the second operation mode.

2. The clock distribution network according to claim 1, further comprising:
a third global buffer configured to receive a reference clock signal, and to generate the global clock signal from the reference clock signal,
wherein the third global buffer is fully activated in the first and second operation modes.

3. The clock distribution network according to claim 1, further comprising:
a fourth global buffer configured to receive an output signal of the first global buffer, and to generate the first distributed clock signal by buffering the output signal of the first global buffer; and
a fifth global buffer configured to receive an output signal of the second global buffer, and to generate the second distributed clock signal by buffering the output signal of the second global buffer,
wherein the fourth global buffer is fully activated in the first and second operation modes, and the fifth global buffer is fully activated in the first operation mode and is deactivated in the second operation mode.

4. The clock distribution network according to claim 3, further comprising:
a first local buffer configured to receive the first distributed clock signal, and to generate a first local clock signal from the first distributed clock signal; and
a second local buffer configured to receive the first distributed clock signal, and to generate a second local clock signal from the first distributed clock signal,
wherein the first local buffer is fully activated in the first and second operation modes, and the second local buffer is fully activated in the first operation mode and is partially activated in the second operation mode.

5. The clock distribution network according to claim 4, further comprising:
a third local buffer configured to receive an output signal of the first local buffer, and to generate the first local clock signal by buffering the output signal of the first local buffer; and
a fourth local buffer configured to receive an output signal of the second local buffer, and to generate the second local clock signal by buffering the output signal of the second local buffer,
wherein the third local buffer is fully activated in the first and second operation modes, and the fourth local buffer is fully activated in the first operation mode and is deactivated in the second operation mode.

6. A semiconductor apparatus comprising:
a first global buffer configured to receive a global clock signal, and to buffer the global clock signal based on a first global enable signal and a second global enable signal;
a second global buffer configured to receive the global clock signal, and to buffer the global clock signal based on the first global enable signal and a third global enable signal; and
a clock control circuit configured to enable all the first global enable signal, the second global enable signal, and the third global enable signal in a first operation mode, and to enable the first global enable signal and the second global enable signal and disable the third global enable signal in a second operation mode.

7. The semiconductor apparatus according to claim 6, further comprising:
a third global buffer configured to receive a reference clock signal, and to generate the global clock signal by buffering the reference clock signal based on the first global enable signal.

8. The semiconductor apparatus according to claim 6, further comprising:
a fourth global buffer configured to receive an output signal of the first global buffer, and to buffer the output signal of the first global buffer based on the second global enable signal; and
a fifth global buffer configured to receive an output signal of the second global buffer, and to buffer the output signal of the second global buffer based on the third global enable signal.

9. The semiconductor apparatus according to claim 8, further comprising:
a first local buffer configured to receive an output signal of the fifth global buffer, and to buffer the output signal of the fifth global buffer based on the second global enable signal and a first local enable signal; and
a second local buffer configured to receive the output signal of the fifth global buffer, and to buffer the output signal of the fifth global buffer based on the second global enable signal and a second local enable signal,
wherein the clock control circuit enables all the first local enable signal and the second local enable signal in the first operation mode, and enables the first local enable signal and disables the second local enable signal in the second operation mode.

10. The semiconductor apparatus according to claim 9, further comprising:
a third local buffer configured to receive an output signal of the first local buffer, and to generate a first local clock signal by buffering the output signal of the first local buffer based on the first local enable signal; and
a fourth local buffer configured to receive an output signal of the second local buffer, and to generate a second local clock signal by buffering the output signal of the second local buffer based on the second local enable signal.

11. The semiconductor apparatus according to claim 6, wherein the first global buffer comprises:
a load circuit configured to provide a first voltage to a first output node and a second output node based on the first global enable signal and the second global enable signal;
a first transistor configured to change a voltage level of the second output node based on the global clock signal;

a second transistor configured to change a voltage level of the first output node based on a complementary signal of the global clock signal; and a variable current source configured to form a current path from the first and second transistors to a terminal, to which a second voltage is supplied, based on the first global enable signal and the second global enable signal.

12. The semiconductor apparatus according to claim 6, wherein the second global buffer comprises:

a load circuit configured to provide a first voltage to a first output node and a second output node based on the first global enable signal and the third global enable signal;

a first transistor configured to change a voltage level of the second output node based on the global clock signal;

a second transistor configured to change a voltage level of the first output node based on a complementary signal of the global clock signal; and a variable current source configured to form a current path from the first and second transistors to a terminal, to which a second voltage is supplied, based on the first global enable signal and the third global enable signal.

13. The semiconductor apparatus according to claim 6, wherein the first global buffer comprises:

a first inverter configured to invert the global clock signal;

a first NAND gate configured to receive an output signal of the first inverter and the first global enable signal;

a second NAND gate configured to receive an output signal of the first NAND gate and the second global enable signal; and a second inverter configured to invert an output signal of the second NAND gate.

14. The semiconductor apparatus according to claim 6, wherein the second global buffer comprises:

a first inverter configured to invert the global clock signal;

a first NAND gate configured to receive an output signal of the first inverter and the first global enable signal;

a second NAND gate configured to receive an output signal of the first NAND gate and the third global enable signal; and a second inverter configured to invert an output signal of the second NAND gate.

15. A semiconductor apparatus comprising:

a global clock generation circuit configured to generate a global clock signal based on a clock signal;

a first global buffer configured to generate a first distributed clock signal from the global clock signal, and to provide the first distributed clock signal to a first clock path; and a second global buffer configured to generate a second distributed clock signal from the global clock signal, and to provide the second distributed clock signal to a second clock path, wherein the first and second global buffers are all fully activated in a first operation mode, and the first global buffer is fully activated and the second global buffer is partially activated in a second operation mode.

16. The semiconductor apparatus according to claim 15, wherein the first global buffer is activated based on a first global enable signal and a second global enable signal, wherein the second global buffer is activated based on the first global enable signal and a third global enable signal, and wherein the first to third global enable signals are all enabled in the first operation mode, and the first and second global enable signals are enabled and the third global enable signal is disabled in the second operation mode.

17. The semiconductor apparatus according to claim 16, wherein the first clock path further comprises:

a first local buffer configured to provide the first distributed clock signal to a first local clock generation circuit; and a second local buffer configured to provide the first distributed clock signal to a second local clock generation circuit, wherein the first and second local buffers are fully activated in the first operation mode, and the first local buffer is fully activated and the second local buffer is partially activated in the second operation mode.

18. The semiconductor apparatus according to claim 17, wherein the first local buffer is activated based on a second global enable signal and a first local enable signal, the second local buffer is activated based on the second global enable signal and a second local enable signal, and wherein the first and second local enable signals are all enabled in the first operation mode, and the first local enable signal is enabled and the second local enable signal is disabled in the second operation mode.

19. The semiconductor apparatus according to claim 17, wherein the first local clock generation circuit generates a first local clock signal from an output signal of the first local buffer, and generates a strobe signal from the first local clock signal.

20. The semiconductor apparatus according to claim 17, wherein the second local clock generation circuit generates a second local clock signal from an output signal of the second local buffer, and receives or outputs data based on the second local clock signal.

21. The semiconductor apparatus according to claim 17, wherein the second clock path comprises:

a third local buffer configured to provide the second distributed clock signal to a third local clock generation circuit, wherein the third local buffer is fully activated in the first operation mode and is deactivated in the second operation mode.

22. The semiconductor apparatus according to claim 21, wherein the third local buffer is activated based on the third global enable signal and a third local enable signal, and wherein the third local enable signal is enabled in the first operation mode and is disabled in the second operation mode.

23. The semiconductor apparatus according to claim 21, wherein the third local clock generation circuit generates a third local clock signal from an output signal of the third local buffer, and receives or outputs data in synchronization with the third local clock signal.

* * * * *